July 23, 1935.  C. H. PARSONS  2,009,238
LOW TEMPERATURE EMULSIFICATION OF CHEESE
Filed April 21, 1931
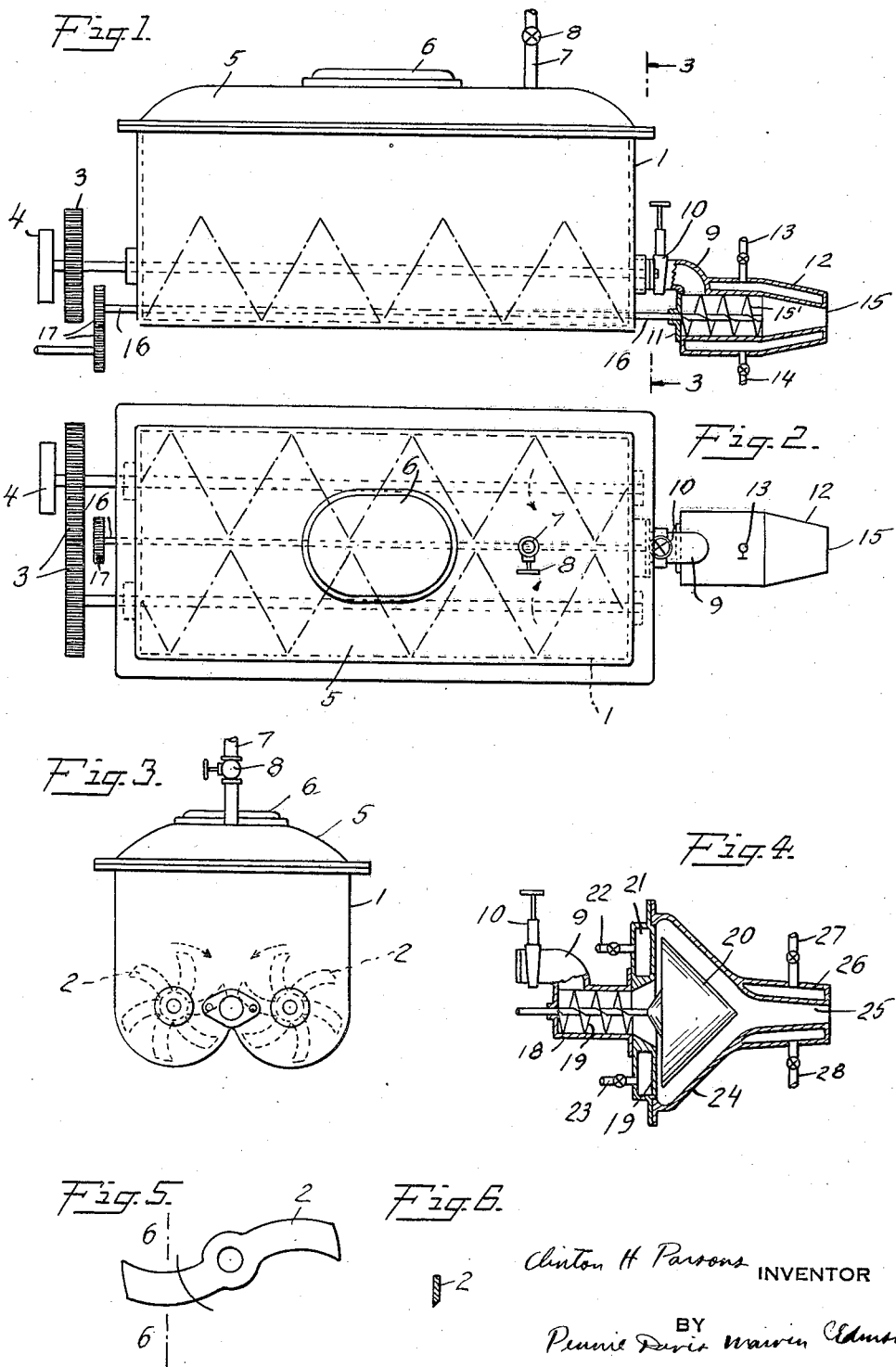
Clinton H. Parsons INVENTOR
BY Pennie Davis Marvin Edmonds
ATTORNEYS Patented July 23, 1935

2,009,238

UNITED STATES PATENT OFFICE 2,009,238

LOW TEMPERATURE EMULSIFICATION OF CHEESE

Clinton H. Parsons, Chicago, Ill., assignor to Swift & Company, Chicago, Ill., a corporation of Illinois Application April 21, 1931, Serial No. 531,730

12 Claims. (Cl. 99—11)

This invention relates to an improved method for the low temperature emulsification of cheese and includes the improved product resulting therefrom.

According to the present invention, cheese is subjected to emulsification treatment at low temperatures under a high vacuum, thereby preventing the admixture of air with the cheese and the incorporation of air in the cheese and also removing from the cheese such dissolved or admixed gases or readily volatile constituents as it may contain. The resulting product is free from admixed or dissolved air and has valuable keeping properties.

The present invention is an improvement upon the process and product of U. S. Letters Patent No. 1,522,383 which describes the emulsification of cheese at a low temperature. The product produced by such process has fair keeping qualities, but if held too long at ordinary temperatures it will develop a rancid stale flavor due to the admixture of air and the incorporating of air in the cheese during processing. Such admixture of air is prevented in the present process, and a product of enhanced keeping qualities is produced.

The present low temperature emulsification process can be carried out in a vacuum without the application of heat, at ordinary temperatures, or at low temperatures, or with only moderate heating of cheese so that the temperature does not exceed about 115° F. while under a vacuum.

The cheese which is treated according to the present process may be blended or unblended, with or without the addition of certain condiments such as pimiento, peppers, sage, relish, and other flavoring substances. In making blended cheese, for example, the cheese is graded according to the kind, age, and flavor before blending, and the selected cheeses in the desired proportions are then cut into rather large pieces and transferred to the apparatus in which the blending operation is to be carried out. Other substances which are desired to be blended with the cheese are then added, such as, for example, water, common salt, emulsifying salt, flavoring substances, milk powders, etc.

The cheese, or mixtures of different kinds of cheese, together with condiments, flavoring substances, etc. is subjected to a preliminary mixing and blending operation in which the rather large pieces of cheese are cut and mixed in a cutting and mixing machine in which a high vacuum is maintained, e. g. of about 24 to 26 inches. A charge of the material is placed in the machine, the machine is sealed, and a high vacuum applied, and the machine is then set in operation so that the cheese is cut and mixed and formed into a fairly homogeneous mass while the vacuum of around 24 to 26 inches is maintained during this mixing operation. In this way, air is prevented from admixture with the cheese and from being incorporated therein, and admixed or dissolved air and other gases are removed from the cheese mass together with other readily volatile constituents.

After this preliminary mixing and blending operation, the resulting fairly homogeneous mass is discharged into an emulsifying machine such, for example, as that described in prior Patent No. 1,522,383, but the machine should be so connected that the mixture can be forced into and through the emulsifying apparatus without permitting the incorporation of air into the cheese during emulsification. The emulsifying apparatus can similarly be maintained under a high vacuum, so that both the mixing and the emulsifying operations will be carried out under a high vacuum. But if a charge of the cheese is subjected to the preliminary mixing operation under a high vacuum, the vacuum can then be relieved and the solid cheese mass forced through the emulsifying apparatus at ordinary pressure and under conditions that will prevent the incorporation of air therewith during emulsification. When the emulsifying treatment, as well as the preliminary mixing, is carried out under a high vacuum, the entire apparatus can be maintained under the same high vacuum and the emulsified product can be discharged from the emulsifier directly into a package or into a container from which the emulsified product can subsequently be transferred to the package after the vacuum has been relieved.

The preliminarily mixed cheese, etc. is fed into the emulsifier at such a rate that during the emulsifying treatment the original texture of the cheese is destroyed and a product produced which has what is termed as an emulsified texture. This emulsified product is of such a nature that it can be softened or melted by heat without material separation of the butter fat from it.

In order to produce the proper degree of emulsification in the product it may be necessary to run the emulsifier at a very high rate of speed or to constrict the discharge outlet somewhat in order to create a certain amount of back pressure, thereby causing considerable slipping and whipping action between the propeller screw of the emulsifier and the barrel of the machine.

This whipping or slipping action of the particles over one another has the effect in a short time of destroying the original texture of the cheese and producing in its place an emulsified texture.

The apparatus above referred to in which the mixing and cutting of the cheese is carried out concurrently in a vacuum and the mixed material then passed into an emulsifying machine of the Enterprise Hasher type in such a manner that the vacuum is not broken in the transfer of the cheese from the mixer to the emulsifier, is well suited for use in carrying out the present process. The apparatus can, however, be modified and a number of modifications of machines can be used which are capable of carrying out this operation, as, for example, the use, instead of the Enterprise Hasher for carrying out the emulsifying operation, of a machine having a spiral screw conveyor capable of conveying the cheese from the mixer into and between two plates, one revolving at a very high speed and the other stationary, with proper rate of flow of the product between these plates, and with the plates sufficiently close together and of proper design so as to obtain a very excellent degree of emulsification. Instead of using two metal plates, stones may be used, such as are used in ordinary flour or paint mill operations The emulsified product can be packaged directly in glass jars, tin foil lined containers, etc., or, as it discharges from the emulsifying machine in a cylindrical or rectangular section it can be automatically wrapped in tin foil. In such case it will be necessary merely to cut the extruded material into proper lengths and seal the sections with tin foil at each end.

An apparatus suitable for carrying out the process is shown in a somewhat conventional and diagrammatic manner in the accompanying drawing, in which Fig. 1 shows one form of apparatus in elevation, with parts in vertical section;

Fig. 2 is a plan view;

Fig. 3 is an end view taken on the line 3—3 of Fig. 1;

Fig. 4 is a vertical section of a modified form of emulsifying apparatus;

Fig. 5 shows one of the blades of the cutting and mixing apparatus; and

Fig. 6 is a section of one of the blades taken on the line 6—6 of Fig. 5.

In the apparatus illustrated the cutter and mixer consists of a metal chamber 1 similar to a bread dough mixer, in which is installed two sets of cutting and mixing knives 2 carried by shafts driven by gears 3 by means of pulley 4. The cutting and mixing knives rotate in opposite directions, and are of an S-shape construction, ground on one side only and set on the shaft in such a manner as to form a spiral, with the bevelled side of the knife facing the emulsifier.

The chamber has a cover 5 with a removable opening 6 through which the cheese is charged into the apparatus and a vacuum pipe 7 with valve 8 therein connected to a suitable source of vacuum (not shown). The discharge outlet 9 has a suitable valve 10, which is kept closed during the preliminary mixing operation, and at such times as the mixture is not to be forced into the emulsifier.

The cheese charged into the cutting and mixing machine can be in relatively large pieces. If a Daisy form of cheese is used it will only be necessary to cut it into one or two sections. With Cheddar form of cheese it may be necessary to cut it into four or five sections, while with brick cheese it is not necessary to cut it at all.

When the cheese is charged into the apparatus the cover 6 is secured in place, the vacuum valve 8 opened, and the chamber evacuated. The cutters are then set in operation to cut and mix the cheese. During this operation, because of the spiral construction of the knives of the cutter, the cheese is propelled toward the emulsifier end of the machine. Since the discharge valve is closed the mass undergoes a rolling action which thoroughly cuts and mixes it into a more or less homogeneous product. This operation requires, for example, about fifteen or twenty minutes, depending upon the size of the batch.

Connected to the discharge 9 of the mixer is the emulsifier 11, having a heating jacket 12 with inlet and outlet connections 13 and 14 and discharge opening 16. Inside this emulsifier 15 helical screw 15' mounted on shaft 16 driven by gear 17 and adapted to operate at a high rate of speed.

When the mass is properly mixed the valve 10 is opened and the mixed batch forced into and through the emulsifier by the screw 15'. The emulsifier may be of the Enterprise Hasher construction as shown in Figs. 1 and 2, or it may be of the disc type, as shown in Fig. 4.

The emulsifier of Fig. 4 has a casing 18 with spiral screw 19 therein for forcing the cheese into the space between the stationary plate 19 and the rotatable plate 20, the latter rotating at a very high speed. The casing 24 surrounding the rotating place has a discharge opening 25 with a heating jacket 26 having inlet and outlet connections 27 and 28 while the stationary plate 19 has a heating jacket 21 with inlet and outlet connections 22 and 23.

In the emulsifier of Figs. 1 and 2 the cheese may be heated by the heating jacket while it is undergoing emulsification and before it is discharged through the spout 15. Similarly in the emulsifier of Fig. 4 the cheese can be heated by contact with the stationary plate 19 by means of the heating jacket 21 and the cheese may be further heated in its passage through the discharge spout 25 by the heating jacket 26. This heating of the cheese softens or melts the surface of the cheese and aids somewhat in the emulsifying action and also aids in wrapping and sealing the emulsified product in tin foil as it is discharged from the apparatus. The emulsified product will not be heated to more than about 115°, and preferably the temperature is only around 100°. The heating of the cheese somewhat speeds up the operation of emulsification and reduces somewhat the pressure constriction at the discharge end of the emulsifier.

In the operation of the apparatus as a whole the cheese which is preliminarily mixed in the mixer and brought to a more or less homogeneous condition is emulsified during its passage through the emulsifier and is discharged therefrom in an emulsified state such that it can be directly wrapped in tin foil or packaged. By maintaining the cheese under a high vacuum during the cutting, mixing and emulsifying treatment, admixture of air is prevented, thereby giving a stable product which has valuable keeping qualities.

It will be understood that the degree of vacuum required can be somewhat varied and that the details of construction and operation of the apparatus can be varied without departing from the spirit and scope of the invention.

I claim:

1. The method of producing an improved emulsified unpasteurized cheese product which comprises subjecting the cheese at a low temperature and without melting the cheese to a preliminary mixing operation and to a subsequent emulsifying treatment while maintaining the cheese under a vacuum to prevent admixture of air with the cheese and at a temperature below that of pasteurization, thereby giving a low temperature emulsified unpasteurized cheese product with improved keeping qualities, the emulsification of the cheese being rapidly effected by passing the cheese continuously through a high-speed emulsifier, whereby the original texture of the cheese is destroyed and an emulsified texture produced.

2. The method of producing an improved emulsified unpasteurized cheese product which comprises subjecting the cheese at a low temperature and without melting the cheese to a mixing operation under a high vacuum to produce a homogeneous product substantially free from admixed air, and subjecting the resulting product to an emulsifying treatment at a temperature below that of pasteurization to give an emulsified unpasteurized cheese product substantially free from admixed air and of improved keeping qualities, the emulsification of the cheese being rapidly effected by passing the cheese continuously through a high-speed emulsifier, whereby the original texture of the cheese is destroyed and an emulsified texture produced.

3. The method of producing an improved emulsified unpasteurized cheese product which comprises subjecting a batch of cheese admixed with condiments, etc., to a cutting and mixing treatment at a low temperature and without melting the cheese while maintained under a vacuum, thereby forming a substantially homogeneous cheese product, and subjecting such cheese product to an emulsifying treatment without admixture of air therewith and at a temperature below that of pasteurization to give a low temperature emulsified unpasteurized cheese product of improved keeping qualities, the emulsification of the cheese being rapidly effected by passing the cheese continuously through a high-speed emulsifier, whereby the original texture of the cheese is destroyed and an emulsified texture produced.

4. The method of producing an improved emulsified unpasteurized cheese product which comprises introducing a charge of rather large pieces of cheese into a mixer, evacuating the mixer, subjecting the cheese to a cutting and mixing treatment at a low temperature and without melting the cheese while maintained under a vacuum to form the cheese into a substantially homogeneous mass, and subjecting the resulting mass to an emulsifying treatment without admixture of air therewith and at a temperature below that of pasteurization, thereby giving a low temperature emulsified unpasteurized cheese product with improved keeping qualities, the emulsification of the cheese being rapidly effected by passing the cheese continuously through a high-speed emulsifier, whereby the original texture of the cheese is destroyed and an emulsified texture produced.

5. The method of producing an improved emulsified unpasteurized cheese product which comprises subjecting the cheese to a cutting and mixing treatment at a low temperature and without melting the cheese while maintained under a vacuum of about 24 to 26 inches until the cheese is formed into a fairly homogeneous mass, and then subjecting the mass to an emulsifying treatment without admixture of air therewith and at a temperature below that of pasteurization, thereby producing a low temperature cheese product with improved keeping qualities, the emulsification of the cheese being rapidly effected by passing the cheese continuously through a high-speed emulsifier, whereby the original texture of the cheese is destroyed and an emulsified texture produced.

6. An unpasteurized emulsified cheese in which the original cheese texture has been destroyed and an emulsified texture imparted thereto, said cheese being free from admixed and dissolved air and having improved keeping qualities and being capable of being melted without appreciable butter fat separation.

7. An unpasteurized emulsified cheese in which the original cheese texture has been destroyed and an emulsified texture imparted thereto, said cheese being free from admixed air and other gases and from readily vaporizable constituents and being capable of being melted without appreciable butter fat separation.

8. An apparatus for the production of an improved emulsified cheese product comprising a mixer for cutting and mixing the cheese and forming the cheese into a fairly homogeneous product, said mixer having means for producing and maintaining a vacuum therein, and a high-speed continuous emulsifier connected to the mixer with means for passing the cheese rapidly thru the emulsifier to effect the emulsification thereof without admixture of air therewith.

9. An apparatus for the production of an improved emulsified cheese product comprising a mixer for preliminarily admixing the cheese and a high-speed emulsifier for rapidly and continuously emulsifying the admixed cheese, said mixer and emulsifier having means for maintaining a vacuum therein.

10. The method of producing an improved cheese product which comprises cutting, mixing and forming cheese into a fairly homogeneous mass at a low temperature below that of pasteurization, removing air from the cheese mass together with readily volatile constituents, and subjecting the mass to rapid, high-speed, continuous emulsification at a temperature below that of pasteurization while preventing admixture of air with the mass, whereby the original texture of the cheese is destroyed and an emulsified texture imparted thereto.

11. The method of producing an improved cheese product which comprises cutting, mixing and forming cheese into a fairly homogeneous mass at a temperature below the melting point of the cheese and below the pasteurization temperature while preventing air from being admixed with the cheese and from being incorporated therein and removing admixed or dissolved air from the cheese mass together with other readily volatile constituents and then emulsifying the cheese at a temperature below that of pasturerization without permitting the incorporation of air into the cheese during emulsification, the emulsification being effected rapidly by continuously passing the cheese through a high-speed emulsifier to destroy the original texture of the cheese and impart an emulsified texture thereto.

12. The method of producing an improved cheese product which comprises cutting, mixing and forming cheese into a fairly homogeneous mass at a temperature below the melting point of the cheese while preventing air from being admixed with the cheese and from being incorporated therein and removing admixed or dissolved air from the cheese mass together with other readily volatile constituents, then emulsifying the cheese without permitting the incorporation of air into the cheese and then extruding the emulsified material and wrapping it and softening or melting the surface of the cheese as it is extruded to aid in the sealing of the emulsified product in the wrapper, the emulsification being effected rapidly by continuously passing the cheese through a high-speed emulsifier to destroy the original texture of the cheese and impart an emulsified texture thereto.

CLINTON H. PARSONS.